United States Patent
Wallin (10) Patent No.: US 11,498,556 B2
(45) Date of Patent: Nov. 15, 2022

(54) SIDE COLLISION RISK ESTIMATION SYSTEM FOR A VEHICLE

(71) Applicant: APTIV TECHNOLOGIES LIMITED, St. Michael (BB)

(72) Inventor: John Patrik Wallin, Gothenburg (SE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 298 days.

(21) Appl. No.: 16/807,513

(22) Filed: Mar. 3, 2020

(65) Prior Publication Data
US 2020/0282985 A1 Sep. 10, 2020

(30) Foreign Application Priority Data
Mar. 4, 2019 (EP) .................................... 19160451

(51) Int. Cl.
*B60W 30/095* (2012.01)
*B60W 40/105* (2012.01)

(52) U.S. Cl.
CPC ...... *B60W 30/0956* (2013.01); *B60W 40/105* (2013.01); *B60W 2420/42* (2013.01); *B60W 2420/52* (2013.01); *B60W 2520/06* (2013.01); *B60W 2520/10* (2013.01); *B60W 2552/53* (2020.02); *B60W 2554/4042* (2020.02); *B60W 2554/4044* (2020.02); *B60W 2554/801* (2020.02)

(58) Field of Classification Search
CPC .......... B60W 30/0956; B60W 40/105; B60W 2420/42; B60W 2420/52; B60W 2520/06; B60W 2520/10; B60W 2552/53; B60W 2554/801
See application file for complete search history.

(56) References Cited

U.S. PATENT DOCUMENTS

| 8,494,716 B1 | 7/2013 | Lee et al. |
| 2004/0167717 A1 | 8/2004 | Buchanan et al. |
| 2011/0018699 A1* | 1/2011 | Chen .................... B60R 1/00 701/42 |
| 2011/0178710 A1* | 7/2011 | Pilutti ................ B60K 31/0008 701/301 |

(Continued)

OTHER PUBLICATIONS

Extended European Search Report for Application No. EP 19 16 0451 dated Oct. 1, 2019.

*Primary Examiner* — Anshul Sood
(74) *Attorney, Agent, or Firm* — Carlson, Gaskey & Olds, P.C.

(57) ABSTRACT

A side collision risk estimation system for a vehicle comprises a speed sensor, a road line markers detector, a movement sensor, an object detector, and a controller. The controller is configured to estimate: the current speed of the vehicle, a heading of the adjacent road line ahead of the vehicle, a heading of the vehicle, a compensated heading of the vehicle, a predicted lateral change position of the vehicle, a heading of a target vehicle relative to the vehicle, the current speed of the target vehicle, the current lateral distance between the vehicles, the heading of the adjacent road line ahead of the target vehicle, a compensated relative heading of the target vehicle, a predicted lateral change position of the target vehicle, a predicted lateral distance over time between the vehicles, and a side collision risk over time from the predicted lateral distance between the vehicles.

8 Claims, 5 Drawing Sheets

(56) References Cited

U.S. PATENT DOCUMENTS

| | | | |
|---|---|---|---|
| 2017/0197549 A1 | 7/2017 | Vladimerou et al. | |
| 2018/0060677 A1* | 3/2018 | Bai | G06K 9/627 |
| 2018/0086342 A1* | 3/2018 | Ohsugi | G01C 21/30 |
| 2019/0004166 A1 | 1/2019 | Orlowski et al. | |
| 2019/0382018 A1* | 12/2019 | Garnault | B60W 60/00272 |
| 2020/0010073 A1* | 1/2020 | Ryu | B60W 40/06 |
| 2020/0047752 A1* | 2/2020 | Ivanovic | B60W 30/12 |
| 2020/0086854 A1* | 3/2020 | Liu | B60W 30/0956 |
| 2020/0265710 A1* | 8/2020 | Zhan | B60W 60/00274 |

* cited by examiner

FIG. 7

SIDE COLLISION RISK ESTIMATION SYSTEM FOR A VEHICLE

CROSS REFERENCE TO RELATED APPLICATIONS

This application claims priority to European Patent Application No. 19160451.1, filed on Mar. 4, 2019.

TECHNICAL FIELD OF THE INVENTION

The invention relates to a side collision risk estimation system for a host vehicle and to a method of operating the side collision risk estimation system to estimate a side collision risk with a target vehicle succeeding (following) the host vehicle on the other side of a road line adjacent to the host vehicle.

BACKGROUND OF THE INVENTION

Side collision warning systems warn the driver of a host vehicle when a side collision with a target vehicle or a barrier, is imminent. To determine whether a collision is imminent, side collision warning systems often use sensors that are able to measure the current surroundings of the host vehicle, such as a RADAR, to calculate the distance between the target vehicle and the host vehicle, and to estimate the time to collision (TTC) between the host vehicle and the target vehicle.

More particularly when the target vehicle is located behind the host vehicle, in an inner lane of the curve, since the curvature differs depending on the radius of the curve, by simply using the relative heading between the host vehicle and the target vehicle to estimate the travelled path of the target vehicle, in scenarios where the target vehicle is just following its own lane in curves, the side collision warning system might erroneously trigger It is therefore important to propose a new solution to solve this problem.

SUMMARY OF THE INVENTION

According to one embodiment of the invention, a side collision risk estimation system for a host vehicle comprises a speed sensor configured to capture the current speed of the host vehicle; a road line markers detector unit configured to capture road line markers on the path of the host vehicle; a movement sensor unit configured to capture the direction of the host vehicle; an object detector unit configured to detect a target vehicle; a controller in communication with the speed sensor, the road line markers detector unit, the movement sensor unit, and the object detector unit. The controller is configured to estimate the current speed of the host vehicle by means of the speed sensor; estimate a heading of the adjacent road line ahead of the host vehicle by means of the road line markers detector unit; estimate a heading of the host vehicle by means of the movement sensor unit; calculate a compensated heading of the host vehicle by subtracting the estimated heading of the adjacent road line ahead of the host vehicle from the estimated heading of the host vehicle; calculate a predicted lateral change in position of the host vehicle over time relative to the current position of the host vehicle by combining the current speed of the host vehicle, and the compensated heading of the host vehicle; estimate a heading of the target vehicle relative to the host vehicle, estimate the current speed of the target vehicle and estimate the current lateral distance between the host vehicle and the target vehicle by means of the object detector unit; estimate the heading of the adjacent road line ahead of the target vehicle by means of the road line markers detector unit; calculate a compensated relative heading of the target vehicle by subtracting the estimated heading of the adjacent road line ahead of the target vehicle from the estimated relative heading of the target vehicle; calculate a predicted lateral change in position of the target vehicle over time relative to the current position of the target vehicle by combining the current speed of the target vehicle, and the compensated relative heading of the target vehicle; calculate the predicted lateral distance over time between the host vehicle and the target vehicle by combining the current lateral distance with the predicted lateral change in position of the host vehicle over time, and with the predicted lateral change in position of the target vehicle over time; and evaluate a side collision risk over the time from the predicted lateral distance between the host vehicle and the target vehicle.

That system may take into account the current road characteristics such that it provides reliable warning alert regarding side collision risk especially when the host vehicle and target vehicle are travelling along a curve. More particularly, the side collision estimation system may provide an accurate prevision on a time to collision between the host vehicle and the target vehicle while target vehicle, following the host vehicle, is travelling in an inner lane of the curve.

The controller may be configured to estimate the heading of the adjacent road line ahead of the target vehicle by assigning to the adjacent road line markers ahead of the target vehicle, a symmetrical expansion around the origin point of detection of the adjacent road line markers ahead of the host vehicle, such that the road line markers detector unit may include only a single vision detector, as a front camera, configured to detect road line markers ahead of the host vehicle.

According to another embodiment of the invention, a host vehicle comprises the system described above. The road line markers detector unit may comprise at least one front camera configured to capture the front road line markers ahead of the host vehicle; the movement sensor unit may comprise a 2D accelerometer or a gyroscope configured to capture the path direction of the host vehicle, and the object detector unit may comprise at least one rear RADAR sensor or LIDAR sensor, preferably arranged at side rear corner of the host vehicle, and configured to detect an object at a side rear location of the host vehicle. The host vehicle may be equipped with four corner side RADAR sensors, each corner side RADAR sensor being arranged at one corner of the host vehicle. Each corner side RADAR sensor may have at least a 90° field of view.

According to an embodiment of the invention, a method of operating the side collision risk estimation system described above to estimate a side collision risk with a target vehicle succeeding (following) the host vehicle on the other side of a road line adjacent to the host vehicle, comprises the steps of:
  estimating the current speed of the host vehicle;
  estimating the heading of the adjacent road line ahead of the host vehicle;
  estimating the heading of the host vehicle;
  calculating a compensated heading of the host vehicle by subtracting the estimated heading of the adjacent road line ahead of the host vehicle to the estimated heading of the host vehicle;
  calculating the predicted lateral change in position of the host vehicle over time relative to the current position of the host vehicle by combining the current speed of the host vehicle, and the compensated heading of the host vehicle;

estimating the current speed of the target vehicle;

estimating the heading of the adjacent road line ahead of the target vehicle;

estimating the relative heading of the target vehicle to the host vehicle;

calculating a compensated relative heading of the target vehicle by subtracting the estimated heading of the adjacent road line ahead of the target vehicle from the estimated relative heading of the target vehicle;

calculating the predicted lateral change position of the target vehicle over the time relative to the current position of the target vehicle by combining the current speed of the target vehicle, and the compensated relative heading of the target vehicle;

estimating the current lateral distance between the host vehicle and the target vehicle;

calculating a predicted lateral distance over time between the host vehicle and the target vehicle by combining the current lateral distance with the predicted lateral change in position of the host vehicle over time, and with the predicted lateral change in position of the target vehicle over time; and evaluating side collision risk over time from the predicted lateral distance between the host vehicle and the target vehicle.

According to the method, the step of estimating the heading of the adjacent road line ahead of the target vehicle preliminary comprises assigning to the adjacent road line markers ahead of the target vehicle a symmetrical expansion around the origin point of detection of the adjacent road line markers ahead of the host vehicle.

According to the method, the step of estimating the heading of the adjacent road line ahead of the target vehicle comprises detecting road line markers only ahead of the host vehicle.

A device comprises one or more processors; memory; and one or more programs stored in memory, the one or more programs including instructions for performing the method described above.

A non-transitory computer-readable storage-medium comprises one or more programs for execution by one or more processors of a device, the one or more programs including instructions which, when executed by the one or more processors, cause the device to perform the method described above.

BRIEF DESCRIPTION OF THE DRAWINGS

Other features, objects and advantages of the invention will become apparent from reading the detailed description that follows, and the attached drawings, given by way of example and in which.

DETAILED DESCRIPTION

Figure 1:
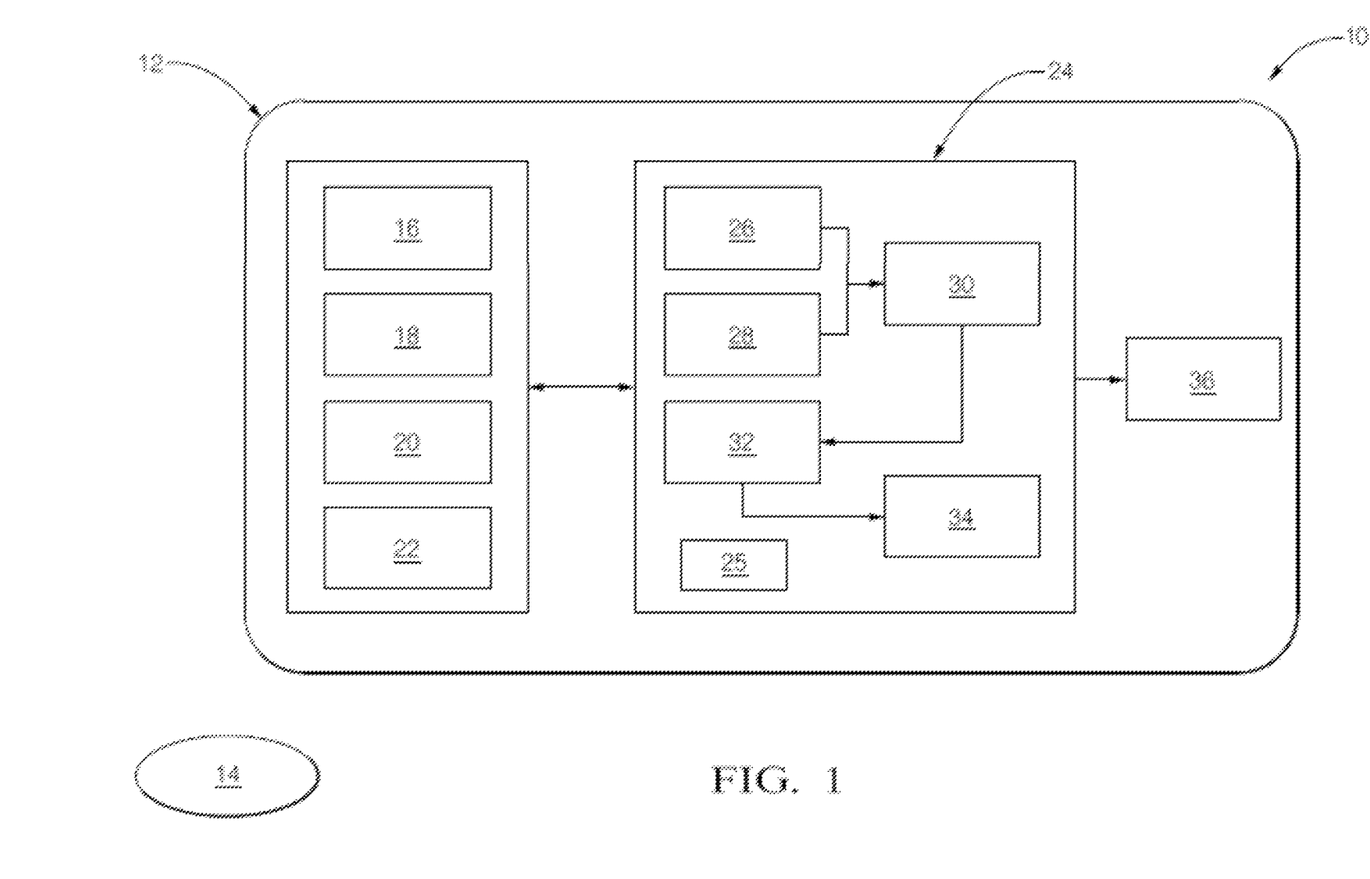
FIG. 1 is a schematic block diagram of the side collision risk estimation system for a host vehicle according to one embodiment of the invention.

According to FIG. 1, a side collision risk estimation system 10 for a host vehicle 12 is shown. The side collision risk estimation system 10 is configured to evaluate a side collision risk between the host vehicle 12 and a target vehicle 14 succeeding the host vehicle 12 on the other side of the road line adjacent to the host vehicle 12. According to the description, the adjacent road line is the road line that separates the lane of the target vehicle 14 from the host vehicle 12.

The system 10 comprises a speed sensor 16 configured to capture the current speed $V_{hv}$ of the host vehicle 12, a road line markers detector unit 18 configured to capture road line markers on the path of the host vehicle 12; a movement sensor unit 20 configured to capture the direction of the host vehicle 12; and an object detector unit 22 configured to detect a target vehicle 14 in the neighboring of the host vehicle 12.

More particularly, the road line markers detector unit 18 may comprise a front vision detector and a rear vision detector such that the system 10 may evaluate the heading of the adjacent road line ahead of the host vehicle 12 and also the heading of the adjacent road line behind the host vehicle 12. In other words, the system 10 may estimate or predict the heading of the adjacent road line ahead of the host vehicle 12 and also the heading of the adjacent road line behind the host vehicle 12.

In the example embodiment, it is assumed that the adjacent road line markers arranged on the side of the host vehicle and the adjacent road line markers arranged behind the host vehicle 12, i.e. behind the detection zone of the front vision detector, are a symmetrical expansion around the origin point of the adjacent road line markers ahead of the host vehicle 12. More precisely, the symmetrical expansion is an axial symmetry around the axis orthogonal to the tangent line of the curved road line at the origin point of detection.

Accordingly, when the target vehicle 14 is in the rear neighboring of the host vehicle 12, it may be considered that the adjacent road line markers ahead of the target vehicle 14 are a symmetrical expansion around the origin point of the detected adjacent road line markers ahead of the host vehicle 12, such that the system 10 may comprise only one front vision detector, as a single front camera arranged on the front windshield of the host vehicle 12, or elsewhere, that only captures the road line markers in front of the host vehicle.

Accordingly, the system 10 comprises a controller 24, or a processor, configured to estimate the heading of the road ahead of the host vehicle 12 from the adjacent road line markers ahead of the host vehicle 12 and also to estimate the heading of the road ahead of the target vehicle 14 from the adjacent road line markers ahead of the host vehicle 12.

More particularly, the movement sensor unit 20 of the host vehicle 12 may be a two dimensions or three dimensions accelerometer, or alternatively a gyroscope, that is able to sense the direction of the host vehicle 12. Those particular solutions provide faster and more accurate movement information than other means such as a navigation system, steering wheel inclination sensor or other sensor coupled with mechanical part of the host vehicle 12.

More particularly, the object detector unit 22 may be a camera, a RADAR sensor or a LIDAR sensor. Preferably, the object detector unit 22 may comprise two rear corner side RADAR sensors or rear side LIDAR sensors arranged on the right and on the left side rear corner of the host vehicle 12 such that a target vehicle 14 approaching the host vehicle 12 and traveling toward the host vehicle 12, in the same direction as the host vehicle 12, and on the other side of a road line adjacent to the host vehicle 12 may be easily detected, located and speed evaluated. A 90° field of view for each rear corner side sensor may be enough to cover the desired rear side portion of the host vehicle 12.

In the example embodiment, the system 10 comprises the controller 24 in communication with the speed sensor 16, the road line markers detector unit 18, the movement sensor unit 20, and the object detector unit 22.

The controller 24 comprises a heading of a road line estimation block 26, such that by means of the road line markers detector unit 18, the controller 24 is configured to estimate the heading of the adjacent road line ahead of the host vehicle 12 and extrapolate the heading of the adjacent road line ahead of the host vehicle 12 to estimate the heading of the adjacent road line ahead of the target vehicle 14.

The controller 24 comprises a heading of a vehicle estimation block 28, such that by means of the movement sensor unit 20 of the host vehicle 12, the controller 24 is able to estimate a heading of the host vehicle 12. In addition, by means of the object detector unit 22, the heading of a vehicle estimation block 28 of the controller 24 is configured to estimate the heading of the target vehicle 14 relative to the host vehicle 12.

For more accurate prediction of the path of the host vehicle 12, the controller 24 comprises a compensated heading of vehicle estimation block 30 configured to calculate a compensated heading of the host vehicle 12 by subtracting the estimated heading of the adjacent road line ahead of the host vehicle 12 from the estimated heading of the host vehicle 12.

To predict a deviation of the trajectory of the host vehicle 12 inside the road boundaries, i.e. the road line markers, the controller 24 comprises a vehicle lateral change in position block 32 configured to calculate a predicted lateral change in position of the host vehicle 12 over time relative to the current position of the host vehicle 12 by combining the current speed $V_{hv}$ of the host vehicle 12, and the compensated heading of the host vehicle 12.

The usage of the compensated heading of the host vehicle 12 provides a great accuracy on estimation of the particular timing from when the host vehicle 12 may leave its lane by crossing the adjacent road line in a curved road such that side collision risk estimation with the target vehicle 14 increased.

A vehicle estimation block of the controller 24 is configured to estimate a heading of the target vehicle 14 relative to the host vehicle 12 by means of the object detector unit 22 of the host vehicle 12. By means of the object detector unit 22 of the host vehicle 12, the controller 24 is also configured to estimate the current speed of the target vehicle 14. The controller 24 comprises a lateral distance estimation block 34 such that by means of the object detector unit 22 of the host vehicle 12, the controller 24 is configured to estimate the current lateral distance between the host vehicle 12 and the target vehicle 14. The determination or estimation of the cited parameters of the target vehicle 14 relative to the host vehicle 12 are necessary to monitor the behavior of the target vehicle 14 relative to the behavior of the host vehicle 12.

In the example embodiment, for more accurate prediction of the path of the target vehicle 14, the compensated heading of vehicle estimation block 30 of the controller 24 is configured to calculate a compensated relative heading of the target vehicle 14 by subtracting the estimated heading of the adjacent road line ahead of the target vehicle 14 from the estimated relative heading of a target vehicle 14.

To predict a deviation of the trajectory of the target vehicle 14 inside its road boundaries, i.e. its road line markers, the vehicle lateral change position block 32 of the controller 24 is configured to calculate a predicted lateral change in position of the target vehicle 14 over time relative to the current position of the target vehicle 14 by combining the current speed $V_{tv}$ of the target vehicle 14, and the compensated relative heading of the target vehicle 14.

The usage of the compensated relative heading of the target vehicle 14 provides a great accuracy on estimation of the particular timing from when the target vehicle 14 may leave its lane by crossing the adjacent road line in a curved road such that side collision risk estimation with the host 12 vehicle increased.

To predict a side collision between the target vehicle 14 and the host vehicle 12, i.e. a zero lateral distance between both vehicles, the lateral distance estimation block 34 of the controller 24 is configured to calculate the predicted lateral distance over time between the host vehicle 12 and the target vehicle 14 by combining the current lateral distance with the predicted lateral change in position of the host vehicle 12 over time, and with the predicted lateral change in position of the target vehicle 14 over time.

Thus, from the predicted lateral distance over time between the host vehicle 12 and the target vehicle 14, the controller 24 is configured to evaluate side collision risk over time. The controller 24 comprises a side collision risk estimation block 36 configured to assess the risk of collision and to trigger a side collision warning and some advanced driver-assistance systems (ADAS) if some predetermined threshold(s) is(are) satisfied. For example, a time to collision threshold may be dependent on a reaction time of an ADAS system, or expected human reaction time, such as manual vehicle braking reaction time, that may reduce collision risk.

According to FIGS. 2, 3, 4, 5 and 6, the operation of the side collision risk estimation system of the host vehicle is shown.

Figure 2:
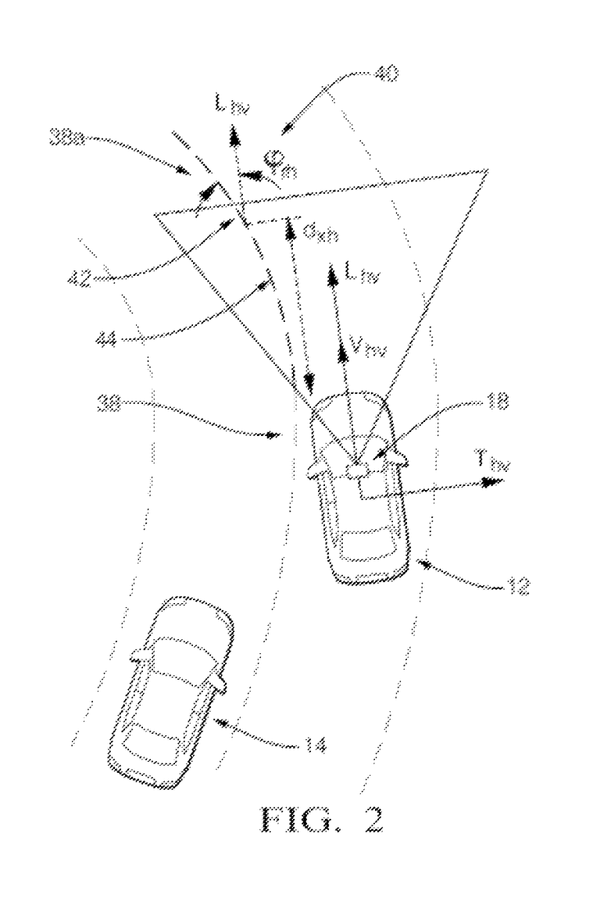
FIG. 2 is schematic view of a target vehicle following the host vehicle on the other side of a road line adjacent to the host vehicle, wherein the system of FIG. 1 is operating a first step for estimating a side collision risk between the host vehicle and the target vehicle.

According to FIG. 2, a longitudinal axis $L_{hv}$ of the host vehicle is defined corresponding to the longitudinal axis $L_{hv}$ of the host vehicle 12, i.e. the axis according to which the host vehicle 12 extends from the rear to the front and globally parallel to a flat road on which the host vehicle 12 is travelling. A transversal axis $T_{hv}$ of the host vehicle 12 is also defined, said host vehicle transversal axis $T_{hv}$ being orthogonal to the host vehicle longitudinal axis $L_{hv}$ and also globally parallel to the flat road on which the host vehicle 12 is travelling. The host vehicle transversal axis $T_{hv}$ is the axis according to which the host vehicle 12 extends from the left to the right.

According to FIG. 2, the target vehicle 14 follows the host vehicle 12 on the other side of the road line 38 adjacent to the host vehicle 12. The road line markers detector unit 18, i.e. the front camera arranged on the front windshield of the host vehicle 12, is capturing images of the road 40 ahead of the host vehicle 12. More particularly, the front camera is capturing images of the adjacent road line markers 42, 44 ahead of the host vehicle 12 such that the controller 24 is able to calculate the heading cm, of the adjacent road line 38a ahead of the host vehicle 12.

Accordingly, the heading cm, of the adjacent road line 38a ahead of the host vehicle 12 detected by the front camera, i.e. the angle cm, of the adjacent road line relative to the host vehicle longitudinal axis $L_{hv}$, is evaluated as a third degree polynomial such that the heading cm, of the adjacent road line 38a ahead of the host vehicle 12 at a distance $d_{xh}$ from the host vehicle 12 can be determined by equation 1:

$$\varphi_{rh}(d_{xh}) = \tan^{-1}(a_1 + a_2 * 2d_{xh} + a_3 * 3d^2_{xh}) \qquad \text{equation 1}$$

wherein the coefficients a1, a2 and a3 are determined by the heading of a road line estimation block 26 of the controller 24.

Figure 3:
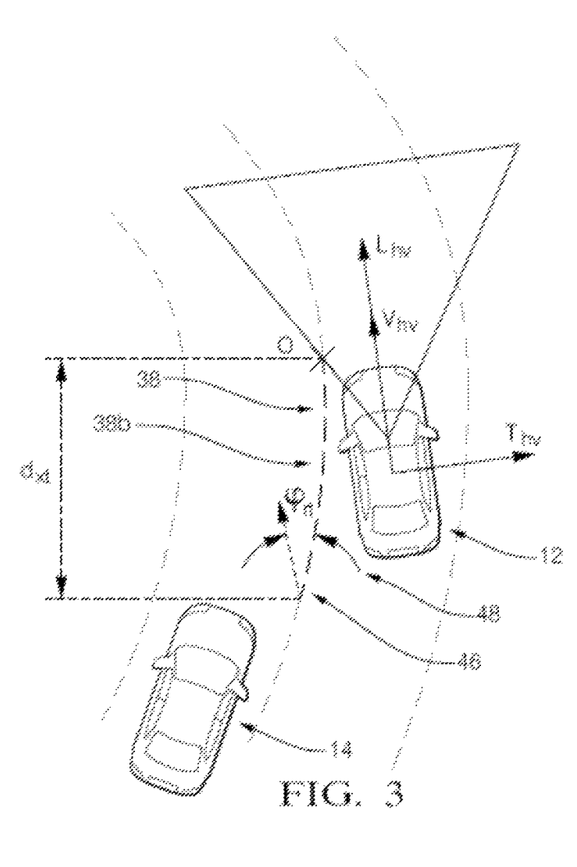
FIG. 3 is a schematic view similar to FIG. 2 wherein the system of FIG. 1 is operating another step for estimating the side collision risk between the host vehicle and the target vehicle.

According to FIG. 3, the exact similar situation of FIG. 2 is shown. According to FIG. 3, the adjacent road line markers 46, 48 ahead of the target vehicle 14 are a symmetrical expansion around the origin point O of the detected adjacent road line markers 42, 44 ahead of the host vehicle 12. In other words, the adjacent road line markers 46, 48 ahead of the target vehicle 14 are the symmetrics of the road line markers 42, 44 ahead of the host vehicle 12 according to an axial symmetry around the axis orthogonal to the tangent line of the curved road line at the origin point of detection of the road line markers 42, 44 ahead of the host vehicle 12.

As it is assumed that the adjacent road line markers 46, 48 ahead of the target vehicle 14 are a symmetrical expansion around the origin point O of the detection of the adjacent road line markers 42, 44 ahead of the host vehicle 12, the heading $\varphi_t$ of the adjacent road line 38b ahead of the target vehicle 14, at a distance $d_{xt}$ from the origin point O, i.e. the angle $\varphi_{rt}$ of the adjacent road line 38b relative to the host vehicle longitudinal axis $L_{hv}$ ahead of the target vehicle 14, at a distance $d_{xt}$ from the origin point O, is evaluated from the equation 2 as the same third degree polynomial of equation 1 such that:

$$\varphi_{rt}(d_{xt}) = \tan^{-1}(a_1 + a_2 * 2d_{xt} + a_3 * 3d^2_{xt}) \qquad \text{equation 2}$$

Figure 4:
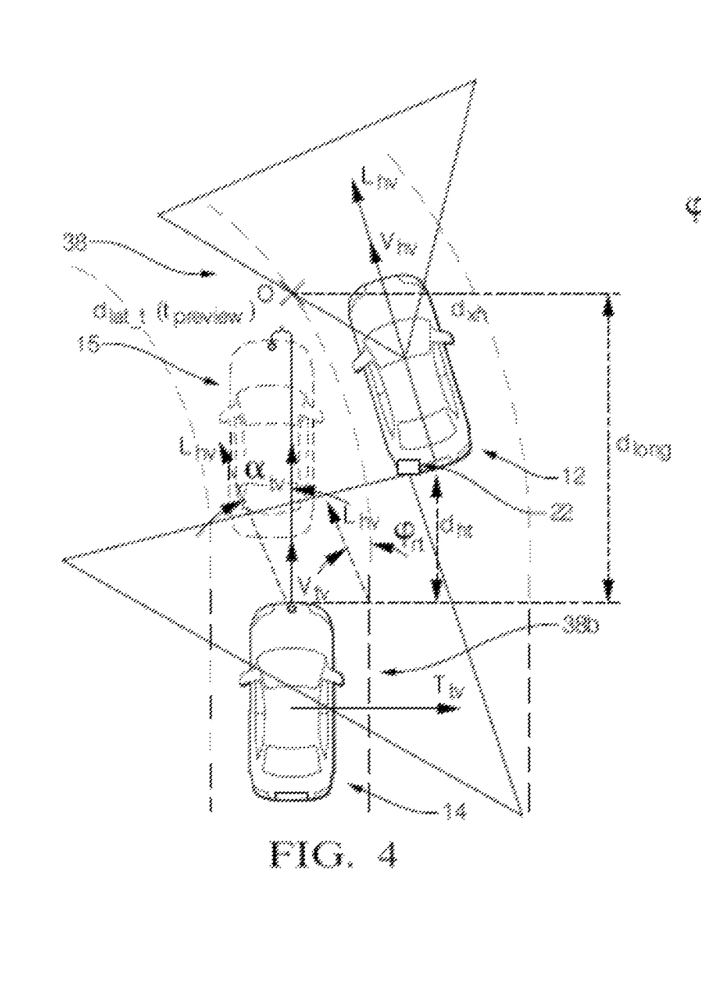
FIG. 4 is a schematic view similar to FIG. 2 wherein the system of FIG. 1 is operating other steps for estimating the side collision risk between the host vehicle and the target vehicle.

According to FIG. 4, the target vehicle 14 follows the host vehicle 12 on the other side of the road line 38 adjacent to the host vehicle 12. The object detector unit 22, i.e. the rear left corner side RADAR sensor of the host vehicle 12, is detecting the target vehicle 14. A ghost target vehicle 15 is shown at a predicted position of the target vehicle 14 at a preview timing $t_{preview}$ based on the current position of the target vehicle 14.

According to FIG. 4, a longitudinal axis $L_{tv}$ of the target vehicle 14 is defined, said target vehicle longitudinal axis $L_{tv}$ corresponding to the longitudinal axis $L_{tv}$ of the target vehicle 14, i.e. the axis according to which the target vehicle 14 extends from the rear to the front and globally parallel to a flat road on which the target vehicle 14 is travelling. A transversal axis $T_{tv}$ of the target vehicle 14 is orthogonal to the target vehicle longitudinal axis $L_{tv}$ and also globally parallel to the flat road on which the target vehicle 14 is travelling. The target vehicle transversal axis $T_{tv}$ is the axis according to which the target vehicle 14 extends from the left to the right.

According to FIG. 4, by means of the rear corner side RADAR sensor of the host vehicle 12, the current speed $V_{tv}$ of the target vehicle 14, the current distance $d_{ht}$ between the host vehicle 12 and the target vehicle 14, and the relative heading $\alpha_{tv}$ of the target vehicle 14 to the host vehicle 12, i.e. relative to the longitudinal axis $L_{hv}$ of the host vehicle 12, are estimated.

From the current distance $d_{ht}$ between the host vehicle 12 and the target vehicle 14, the system 10 is able to determine the current distance $d_{long}$ between the origin point O and the target vehicle 14. From the current distance $d_{long}$ between the origin point O and the target vehicle 14, and from equation 2, the predicted heading $\varphi_{rt}$ of the adjacent road line 38b at the target vehicle 14 is evaluated from equation 3 such that:

$$\varphi_{rt}(d_{long}) = \tan^{-1}(a_1 + a_2 \times 2d_{long} + a_3 \times 3d^2_{long}) \qquad \text{equation 3}$$

From equation 3, the current compensated heading $\alpha_{tv\_comp}$ of the target vehicle 14 is evaluated by subtracting the estimated heading $\varphi_{rt}(d_{long})$ of the adjacent road line 38b at the target vehicle 14 from the estimated relative heading $\alpha_{tv}$ of the target vehicle 14, as equation 4:

$$\alpha_{tv\_comp} = \alpha_{tv} - \varphi_{rt}(d_{long}) \qquad \text{equation 4}$$

From equation 4, the predicted lateral change in position $d_{lat\_t}(t)$ of the target vehicle 14 over time relative to the current position of the target vehicle 14 is evaluated. In other words, the estimated lateral position deviation of the target vehicle 14 over time according to the current transversal axis $T_{tv}$ of the target vehicle 14 is evaluated. The predicted lateral change in position $d_{lat\_t}(t)$ of the target vehicle 14 over time is calculated by combining the current speed $V_{tv}$ of the target vehicle 14 and the compensated relative heading $\alpha_{tv\_comp}$ of the target vehicle 14, using equation 5:

$$d_{lat\_t}(t) = V_{tv} \times \sin(\alpha_{tv} - \varphi_{rt}(d_{long})) \times t \qquad \text{equation 5}$$

According to the example of FIG. 4, at the preview timing $t_{preview}$, the predicted lateral change in position $d_{lat\_t}(t_{preview})$ between the ghost target vehicle 15 position and the target vehicle 14 at the current position is estimated from equation 6:

$$d_{lat\_t}(t_{preview}) = V_{tv} \times \sin(\alpha_{tv} - \varphi_{rt}(d_{long})) \times t_{preview} \qquad \text{equation 6}$$

Figure 5:
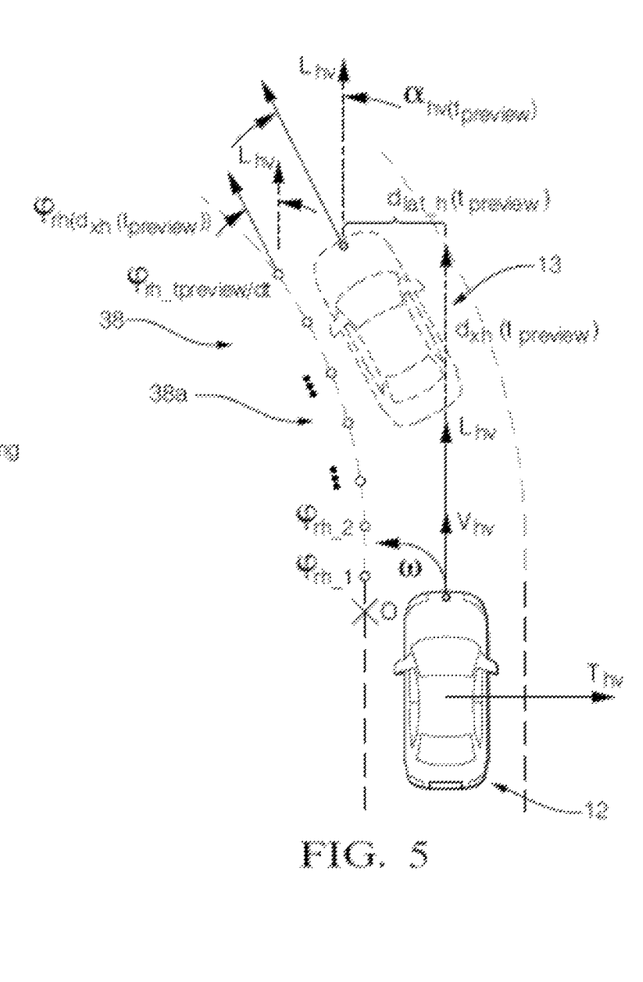
FIG. 5 is a schematic view of the host vehicle travelling in its road lane wherein the system of FIG. 1 is operating steps for estimating the side collision risk between the host vehicle and the target vehicle.

According to FIG. 5, the host vehicle 12 traveling in its lane is shown. A ghost host vehicle 13 is shown at a predicted position of the host vehicle 12 at the preview time $t_{preview}$ following the current position of the host vehicle 12.

According to FIG. 5, the predicted lateral change in position $d_{lat\_h}(t)$ of the host vehicle 12 over time relative to the current position of the host vehicle 12 is evaluated. In other words, the controller 24 is configured to calculate the estimated lateral position deviation of the host vehicle 12 over time according to the current transversal axis $T_{hv}$ of the host vehicle 12.

According to one embodiment, the predicted lateral change in position $d_{lat\_h}(t)$ of the host vehicle 12 over time is then calculated using a constant yaw rate model to calculate the lateral movement of the host vehicle 12. Accordingly, the calculation is done iteratively and the desired predetermined time, i.e. the preview time $t_{preview}$, is divided into segments equaling the length of a sampling interval of the side collision risk estimation system. In the context of the disclosed example embodiment, the length of sampling interval is the time duration between two samplings. In other words, the calculation is done according to a sampling acquisition time of the movement sensor unit 20, and of the road line markers detector unit 18 by the controller 24 of the side collision risk estimation system 10.

Accordingly, by means of the movement sensor unit 20, the heading $\alpha_{hv}$ of the host vehicle 12 is evaluated over time t using equation 7:

$$\alpha_{hv}(t) = \sum_{t=1}^{\frac{t}{dt}} \alpha_{hv}(t-1) + \omega * dt \qquad \text{equation 7}$$

Accordingly, the heading $\alpha_{hv}$ of the host vehicle 12 is evaluated over the preview time $t_{preview}$ using equation 8:

$$\alpha_{hv}(t_{preview}) = \sum_{t=1}^{\frac{t_{preview}}{dt}} \alpha_{hv}(t-1) + \omega * dt \qquad \text{equation 8}$$

wherein ω is the angular velocity of the host vehicle captured by means of the movement sensor unit 20.

According to FIG. 5, the predicted heading $\varphi_{rh}$ of the adjacent road line ahead of the host vehicle 12 is sampled by the system 10, such that the plurality of adjacent road lines markers captured by the front vision detector of the host vehicle 12 are sampled into a plurality of successive single predicted heading samples $\varphi_{rh\_1}, \varphi_{rh\_2}, \ldots \varphi_{rh\_tpreview/dt}$ of the adjacent road line 38a ahead of the current position of the host vehicle 12.

The predicted heading $\varphi_{rh}$ of the adjacent road line 38a that will be reached by the host vehicle over time, is identified as the heading of the adjacent road line 38a at the distance $d_{xh}$ from the host vehicle 12 given by equation 9:

$$d_{xh}(t) = \sum_{t=1}^{\frac{t}{dt}} d_{xh}(t-1) + V_{hv} * dt \qquad \text{equation 9}$$

The predicted heading sample $\varphi_{rh\_tpreview/dt}$ of the adjacent road line 38a that will be reached by the host vehicle 12 at the predetermined time, i.e. at the preview time $t_{preview}$, is identified as being the heading of the adjacent road line 38a at the distance $d_{xh}(t_{preview})$ from the host vehicle 12 given by equation 10:

$$d_{xh}(t_{preview}) = \sum_{t=1}^{\frac{t_{preview}}{dt}} d_{xh}(t-1) + V_{hv} * dt \qquad \text{equation 10}$$

The heading $\varphi_d$, of the adjacent road line 38a at the host vehicle 12 at a time moment relative to its current position is evaluated at the distance reached by the host vehicle 12 at the time moment relative to its current position from equation 11:

$$\varphi_{rh}(d_{xh}(t)) = \tan^{-1}(a_1 + a_2 * 2d_{xh}(t) + a_3 * 3d^2_{xh}(t)) \qquad \text{equation 11}$$

wherein the coefficients a1, a2 and a3 are determined for each heading sample $\varphi_{rh\_1}, \varphi_{rh\_2}, \ldots \varphi_{rh\_tpreview/dt}$ of the adjacent road line 38a ahead of the current position of the host vehicle 12.

From equation 11, the compensated heading $\alpha_{hv\_comp}(t)$ of the host vehicle 12 over the time t is evaluated by subtracting the estimated heading $\varphi_{rh}(d_{xh}(t))$ of the adjacent road line 38a ahead of the host vehicle 12 from the estimated heading $\alpha_{th}(t)$ of the host vehicle 12 over the time, using equation 12:

$$\alpha_{hv\_comp}(t) = \alpha_{hv}(t) - \varphi_{rh}(d_{xh}(t)) \qquad \text{equation 12}$$

From equation 12, the predicted lateral change in position $d_{lat\_h}(t)$ of the host vehicle 12 over time relative to the current position of the host vehicle 12 is evaluated. In other words, the estimated lateral position deviation of the host vehicle 12 over time according to the current transversal axis $T_{hv}$ of the host vehicle 12 is evaluated. The predicted lateral change in position $d_{lat\_h}(t)$ of the host vehicle 12 over the time t is calculated by combining the current speed $V_{hv}$ of the host vehicle 12 and the compensated heading $\alpha_{hv\_comp}(t)$ of the host vehicle 12, using equation 13:

$$d_{lat\_h}(t) = \sum_{t=1}^{\frac{t}{dt}} d_{lat\_h}(t-1) + V_{hv} * \sin(\alpha_{hv}(t) - \varphi_{rh}(d_{xh}(t))) * dt$$

According to the example of FIG. 5, at the preview timing $t_{preview}$, the predicted lateral change in position $d_{lat\_h}(t_{preview})$ between the ghost host vehicle 13 position and the host vehicle 12 at the current position, is estimated from equation 14:

$$d_{lat\_h}(t_{preview}) = \sum_{t=1}^{\frac{t_{preview}}{dt}} d_{lat\_h}(t-1) + V_{hv} * \sin(\alpha_{hv}(t) - \varphi_{rh}(d_{xh}(t))) * dt$$

Figure 6:
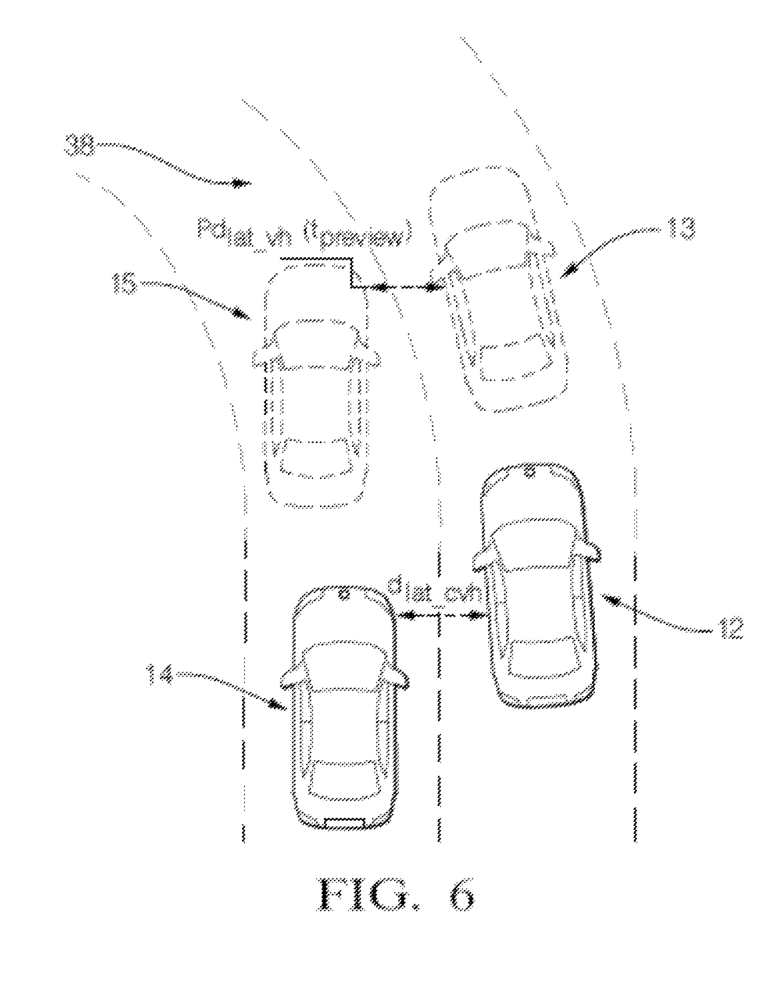
FIG. 6 is a schematic view wherein the system of FIG. 1 is operating a final step for estimating the side collision risk between the host vehicle and the target vehicle.

According to FIG. 6, the target vehicle 14 at a current position at least partially behind the host vehicle 12 at a current position on the other side of the road line 38 adjacent to the host vehicle 12 is shown. The ghost target vehicle 15 at the positon at the preview time $t_{preview}$ and the ghost host vehicle 13 at the same preview time $t_{preview}$ are shown. By the means of the corner side RADAR, preferably a left corner side RADAR or a right corner side RADAR, or a combination of both, the controller 24 of the side collision risk estimation system 10 is configured to evaluate the current lateral distance $d_{lat\_cvh}$ between the host vehicle 12 and the target vehicle 14. Generally, the current lateral distance $d_{lat\_cvh}$ is representative of the shortest measured distance from the host vehicle 12 to the target vehicle 12 while the target vehicle 12 is travelling on the other side of the road line 38 adjacent to the host vehicle 12. From the measured current lateral distance $d_{lat\_cvh}$ between the host vehicle 12 and the target vehicle 14, the system 10 is configured to calculate the predicted lateral distance $Pd_{lat\_vh}$ over the time t between the host vehicle 12 and the target vehicle 14 by combining the current lateral distance $d_{lat\_cvh}$ with the predicted lateral change position $d_{lat\_h}(t)$ of the host vehicle 12 over the time t, and with the predicted lateral change position $d_{lat\_t}(t)$ of the target vehicle 14 over the time using equation 15:

$$Pd_{lat\_vh}(t) = d_{lat\_cvh} + d_{lat\_t}(t) + d_{lat\_h}(t) \qquad \text{equation 15}$$

The predicted lateral change in position $d_{lat\_h}(t)$ of the host vehicle 12 over the time t, and the predicted lateral change in position $d_{lat\_t}(t)$ of the target vehicle 14 over time may be a positive value or a negative value dependent on the transversal direction of the lateral change in position of the host vehicle 12 and of the target vehicle 14.

According to the example of FIG. 6, at the preview timing $t_{preview}$, the predicted lateral distance $Pd_{lat\_vh}(t_{preview})$ between the host vehicle 12 and the target vehicle 14 is estimated from equation 16:

$$Pd_{lat\_vh}(t_{preview})=d_{lat\_cvh}+d_{lat\_t}(t_{preview})+d_{lat\_h}(t_{preview}) \quad \text{equation 16}$$

The collision risk estimation may be set up by setting up a predicted safety lateral distance Pdlat_vh threshold in combination to a time to collision threshold from which a driver of the host vehicle could not be generally able to avoid the collision such that an ADAS system will take over the control of the host vehicle to limit the collision risk.

Figure 7:
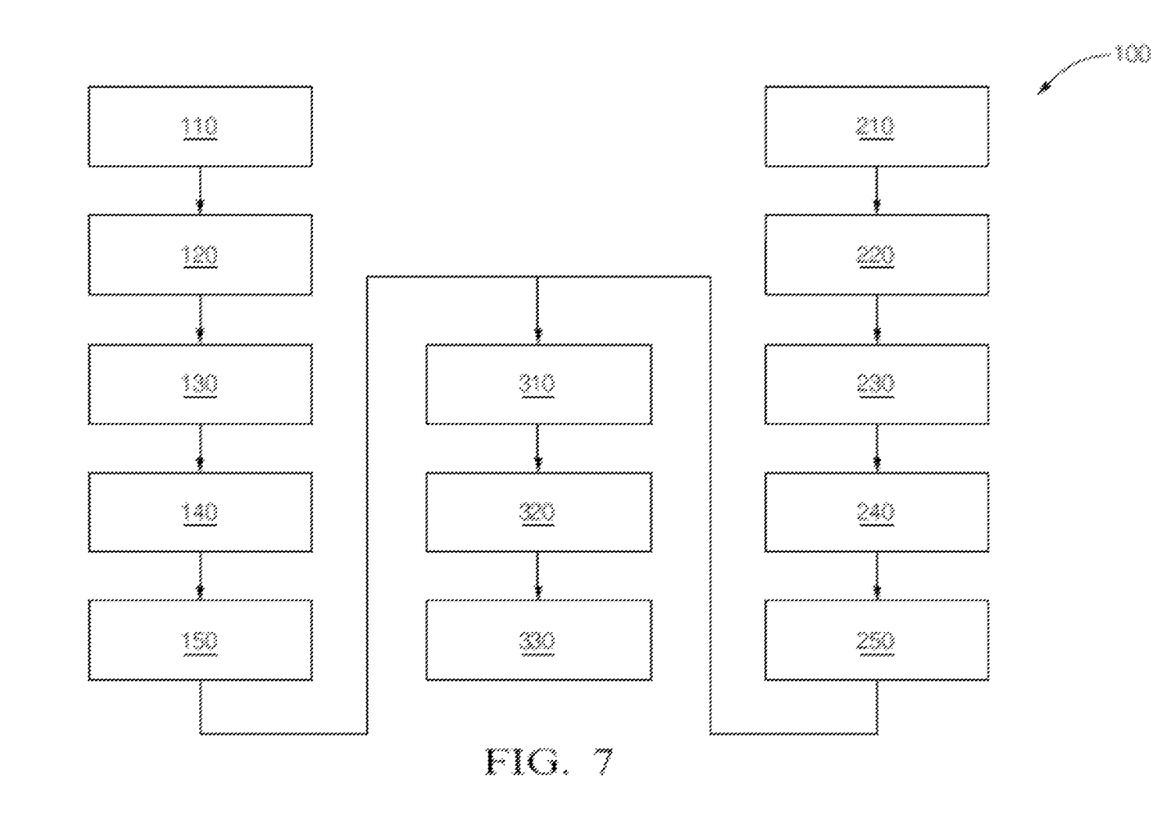
FIG. 7 is a flow chart of a method to operate the side collision risk estimation system according to one embodiment of the invention.

According to FIG. 7, following the description of the previous figures, a method 100 of operating the side collision risk estimation system 10 to estimate a side collision risk with a target vehicle 14 following the host vehicle 12 on the other side of a road line 38 adjacent to the host vehicle 12 comprises some steps for estimating a predicted path over time of the host vehicle 12.

The example method 100 comprises estimating 110 the current speed $V_{hv}$ of the host vehicle 12, estimating 120 the heading $\varphi_{rh}$ of the adjacent road line ahead of the host vehicle 12; and estimating 130 the heading $\alpha_{hv}$ of the host vehicle 12. For an optimum accuracy, the estimation of the heading $\alpha_{hv}$ of the host vehicle 12 is correlated with the heading of the road ahead of the host vehicle 12. Thus, the method comprises calculating 140 a compensated heading $\alpha_{hv\_comp}$ of the host vehicle 12 by combining the estimated heading $\varphi_{rh}$ of the adjacent road line ahead of the host vehicle 12 with the estimated heading $\alpha_{hv}$ of the host vehicle 12. More particularly, calculating 140 the compensated heading $\alpha_{hv\_comp}$ of the host vehicle 12 includes subtracting the estimated heading $\varphi_{rh}$ of the adjacent road line ahead of the host vehicle 12 from the estimated heading $\alpha_{hv}$ of the host vehicle 12.

Starting from the compensated heading $\alpha_{hv\_comp}$ of the host vehicle 12, a predicted lateral deviation relative to the current position of the host vehicle 12 can be calculated. Thus, the method comprises calculating 150 the predicted lateral change in position $d_{lat\_h}(t)$ of the host vehicle 12 over the time t relative to the current position of the host vehicle 12 by combining the current speed $V_{hv}$ of the host vehicle 12, and the compensated heading $\alpha_{hv\_comp}$ of the host vehicle 12. The predicted lateral change in position $d_{lat\_h}(t)$ of the host vehicle 12 over time relative to the current position of the host vehicle 12 takes into account the lateral change of the host vehicle 12 regarding the temporal change direction of the host vehicle 12 provided by its movement sensor unit 20 and the heading $\varphi_{rh}$ of the adjacent road line 38a ahead of the host vehicle 12, such that it will be possible to predict that the host vehicle 12 may leave its road lane as crossing the adjacent road line markers 42, 44.

The method 100 comprises steps relative to the target vehicle 14 in order to evaluate the collision risk between the host vehicle 12 and the target vehicle 14. At first, the method comprises some steps for estimating a predicted path over time of the target vehicle 14.

The example method includes estimating 210 the current speed $V_{tv}$ of the target vehicle 14; estimating 220 the heading $\varphi_{rt}$ of the adjacent road line 38b ahead of the target vehicle 14; and estimating 230 the relative heading $\alpha_{tv}$ of the target vehicle 14 to the host vehicle 12.

For an optimum accuracy, the estimation of the relative heading $\alpha_{tv}$ of the target vehicle 14 is correlated with the heading $\varphi_{rt}$ of adjacent the road line ahead of the target vehicle 14. Thus, the method comprises calculating 240 a compensated relative heading $\alpha_{tv\_comp}$ of the target vehicle 14 by subtracting the estimated heading $\varphi_{rt}$ of the adjacent road line 38b ahead of the target vehicle 14 from the estimated relative heading $\alpha_{tv}$ of the target vehicle 14.

Starting from the compensated relative heading $\alpha_{tv\_comp}$ of the target vehicle 14, a predicted lateral deviation of the target vehicle 14 relative the current position of the target vehicle 14 can be calculated. Thus, the method comprises calculating 250 the predicted lateral change in position $d_{lat\_t}(t)$ of the target vehicle 14 over time relative to the current position of the target vehicle 14 by combining the current speed $V_{tv}$ of the target vehicle 14, and the compensated relative heading $\alpha_{tv\_comp}$ of the target vehicle 14.

In order to predict a time to collision parameter, i.e. a risk of collision over time, the method comprises estimating 310 the current lateral distance between the host vehicle 12 and the target vehicle 14. Such estimation is used as a starting point in time to evaluate a predicted lateral distance over the time between the host vehicle 12 and the target vehicle 14. Thus, the method comprises a step of calculating 320 a predicted lateral distance over the time between the host vehicle 12 and the target vehicle 14 by combining the current lateral distance with the predicted lateral change in position $d_{lat\_h}(t)$ of the host vehicle 12 over time, and with the predicted lateral change in position $d_{lat\_t}(t)$ of the target vehicle 14 over time. More particularly, calculating 320 the predicted lateral distance over time between the host vehicle 12 and the target vehicle 14 comprises adding or subtracting, depending on the transversal direction of the lateral change in position of the host vehicle 12 and of the target vehicle 14, the predicted lateral change in position $d_{lat\_h}(t)$ of the host vehicle 12 over time, and the predicted lateral change in position $d_{lat\_t}(t)$ of the target vehicle 14 over time, to the current lateral distance between the host vehicle 12 and the target vehicle 14.

Finally, the illustrated method 100 comprises evaluating 330 a side collision risk over time from the predicted lateral distance between the host vehicle 12 and the target vehicle 14. The evaluation generally comprises one or more predetermined threshold(s). A predetermined threshold, such as a time to collision threshold relative to a reaction time of an ADAS system, or relative to an expected human reaction time, such as a manual vehicle braking reaction time, may be used for that evaluation.

According to the assumption that the adjacent road line markers arranged on the side of the host vehicle and the adjacent road line markers road arranged behind the host vehicle 12, i.e. behind the detection zone of the front vision detector, are a symmetrical expansion around the origin point O of detection of the adjacent road line markers 42, 44 ahead of the host vehicle 12, the step of estimating 220 the heading $\varphi_{rt}$ of the adjacent road line 38b ahead of the target vehicle 14 can preliminarily comprise assigning 120 to the adjacent road line markers 46, 48 in a location ahead of the target vehicle 14 a symmetrical expansion around the origin point O of detection of the adjacent road line markers 42, 44 ahead of the host vehicle 12. Thus, estimating 220 the heading $\varphi_{rt}$ of the adjacent road line 38b ahead of the target vehicle 14 can comprise a step of detecting road line markers 42, 44 only ahead of the host vehicle 12.

Referring again to FIG. 1, the system 10 includes a device that includes one or more instances of the controller 24, a memory 25, and one or more instances of a program stored in the memory 25. The one or more programs include instructions for performing the method 100.

The system 10 also includes or consists of a non-transitory computer-readable storage medium comprising one or more programs for execution by one or more controller 24 or processor of the device, the one or more programs including instructions which, when executed by the one or more controller 24 or processor, cause the device to perform the method 100.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. A side collision risk estimation system for a host vehicle, comprising:
   a speed sensor configured to capture a current speed of the host vehicle;
   a road line markers detector configured to capture road line markers on a path of the host vehicle;
   a movement sensor configured to capture a direction of the host vehicle;
   an object detector configured to detect a target vehicle that is at least partially behind the host vehicle; and
   a controller in communication with the speed sensor, the road line markers detector, the movement sensor, and the object detector, said controller being configured to:
   estimate the current speed of the host vehicle based on an indication from the speed sensor;
   estimate a heading of an adjacent road line ahead of the host vehicle based on an indication from the road line markers detector;
   estimate a heading of the host vehicle based on an indication from the movement sensor;
   calculate a compensated heading of the host vehicle by subtracting the estimated heading of the adjacent road line ahead of the host vehicle from the estimated heading of the host vehicle;
   calculate a predicted lateral change in position of the host vehicle over time relative to a current position of the host vehicle by combining the current speed of the host vehicle, and the compensated heading of the host vehicle;
   estimate a relative heading of the target vehicle relative to the host vehicle, estimate a current speed of the target vehicle and estimate a current lateral distance between the host vehicle and the target vehicle based on an indication from the object detector;
   estimate a heading of the adjacent road line in a location ahead of the target vehicle based on an indication from the road line markers detector by assigning a symmetrical expansion around an origin point of detection of the adjacent road line markers ahead of the host vehicle;
   calculate a compensated relative heading of the target vehicle by subtracting the estimated heading of the adjacent road line in the location ahead of the target vehicle from the estimated relative heading of the target vehicle;
   calculate a predicted lateral change in position of the target vehicle over time relative to a current position of the target vehicle by combining the current speed of the target vehicle and the compensated relative heading of the target vehicle;
   calculate a predicted lateral distance over time between the host vehicle and the target vehicle by combining the current lateral distance with the predicted lateral change in position of the host vehicle over time and with the predicted lateral change in position of the target vehicle over time;
   evaluate a side collision risk over time from the predicted lateral distance over time between the host vehicle and the target vehicle; and
   selectively activate at least one of a warning or an advanced driver assistance system based on the side collision risk.

2. The system of claim 1, wherein the road line markers detector is a single vision detector configured to detect road line markers ahead of the host vehicle.

3. A host vehicle comprising the system of claim 1.

4. The host vehicle according to claim 3, wherein
   the road line markers detector comprises at least one front camera configured to capture front road line markers ahead of the host vehicle;
   the movement sensor comprises a 2D accelerometer or a gyroscope configured to capture the path direction of the host vehicle; and
   the object detector comprises at least one rear RADAR sensor or LIDAR sensor, arranged at a corner side of the host vehicle, said object detector being configured to detect an object at a side rear location of the host vehicle.

5. A method of estimating a side collision risk between a host vehicle on one side of a road line adjacent the host vehicle and a target vehicle at least partially behind the host vehicle on an opposite side of the road line adjacent to the host vehicle, said method comprising:
   estimating a current speed of the host vehicle;
   estimating a heading of the road line in a location ahead of the host vehicle;
   estimating a heading of the host vehicle;
   calculating a compensated heading of the host vehicle by subtracting the estimated heading of the road line in the location ahead of the host vehicle from the estimated heading of the host vehicle;
   calculating a predicted lateral change in position of the host vehicle over time relative to a current position of the host vehicle by combining the current speed of the host vehicle and the compensated heading of the host vehicle;
   estimating a current speed of the target vehicle;
   estimating a heading of the road line in a location ahead of the target vehicle by assigning a symmetrical expansion around an origin point of detection of the road line in the location ahead of the host vehicle;
   estimating a relative heading of the target vehicle relative to the host vehicle;
   calculating a compensated relative heading of the target vehicle by subtracting the estimated heading of the road line in the location ahead of the target vehicle from the estimated relative heading of the target vehicle;
   calculating a predicted lateral change in position of the target vehicle over time relative to a current position of the target vehicle by combining the current speed of the target vehicle and the compensated relative heading of the target vehicle;
   estimating a current lateral distance between the host vehicle and the target vehicle;
   calculating a predicted lateral distance over time between the host vehicle and the target vehicle by combining the current lateral distance with the predicted lateral change in position of the host vehicle over time and with the predicted lateral change in position of the target vehicle over time;
   evaluating a side collision risk over time from the predicted lateral distance over time between the host vehicle and the target vehicle; and selectively activating at least one of a warning or an advanced driver assistance system based on the side collision risk.

6. The method according to claim 5, wherein estimating the heading of the road line ahead of the target vehicle comprises detecting road line markers only ahead of the host vehicle.

7. A device, comprising:
at least one processor;
memory; and
at least one program stored in the memory, the at least one program including instructions for performing the method of claim 5.

8. A non-transitory computer-readable storage-medium comprising at least one program for execution by one or more processors of a first device, the at least one program including instructions which, when executed by at least one processor, cause the device to perform the method of claim 5.

* * * * *